Patented Oct. 10, 1950

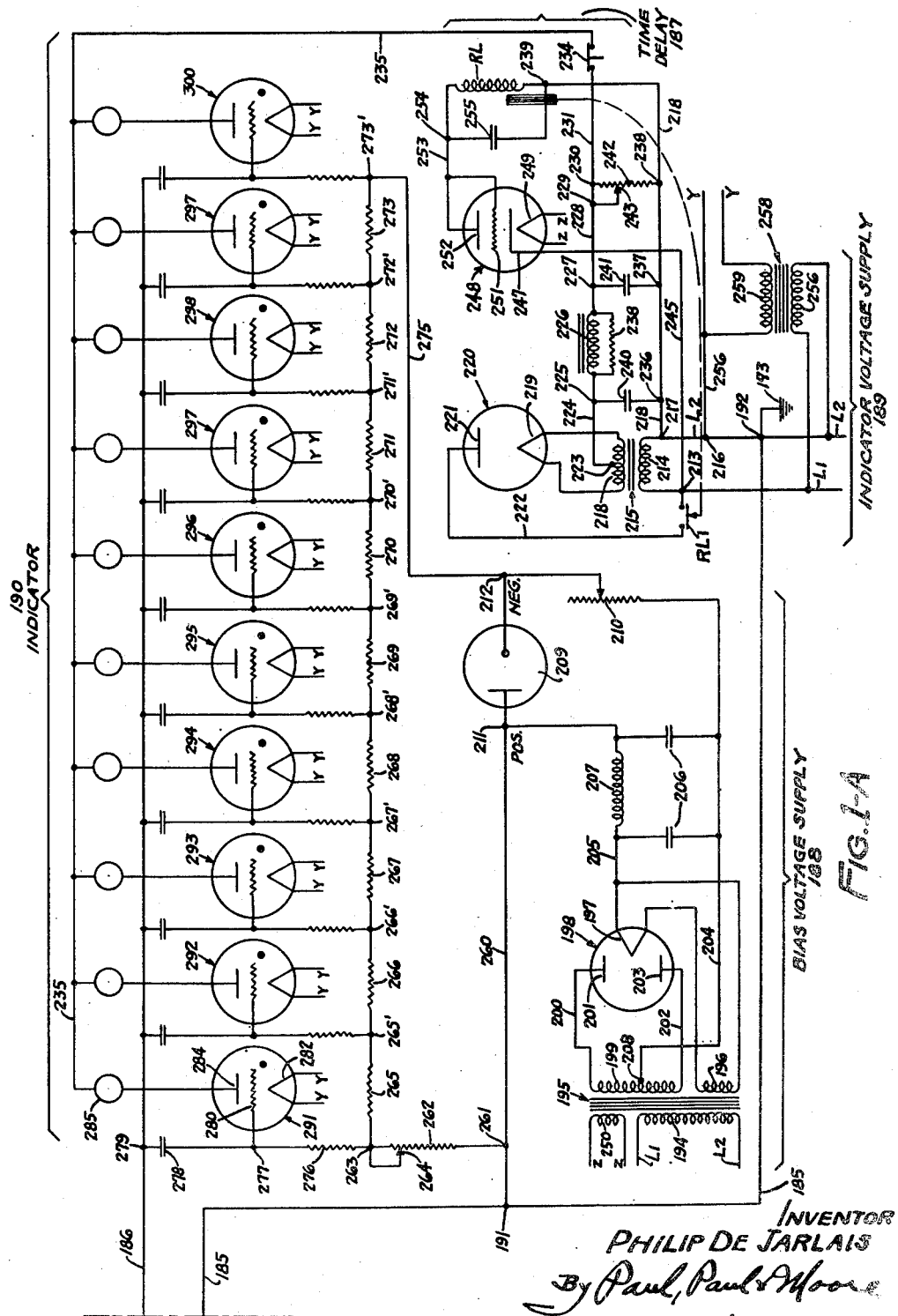

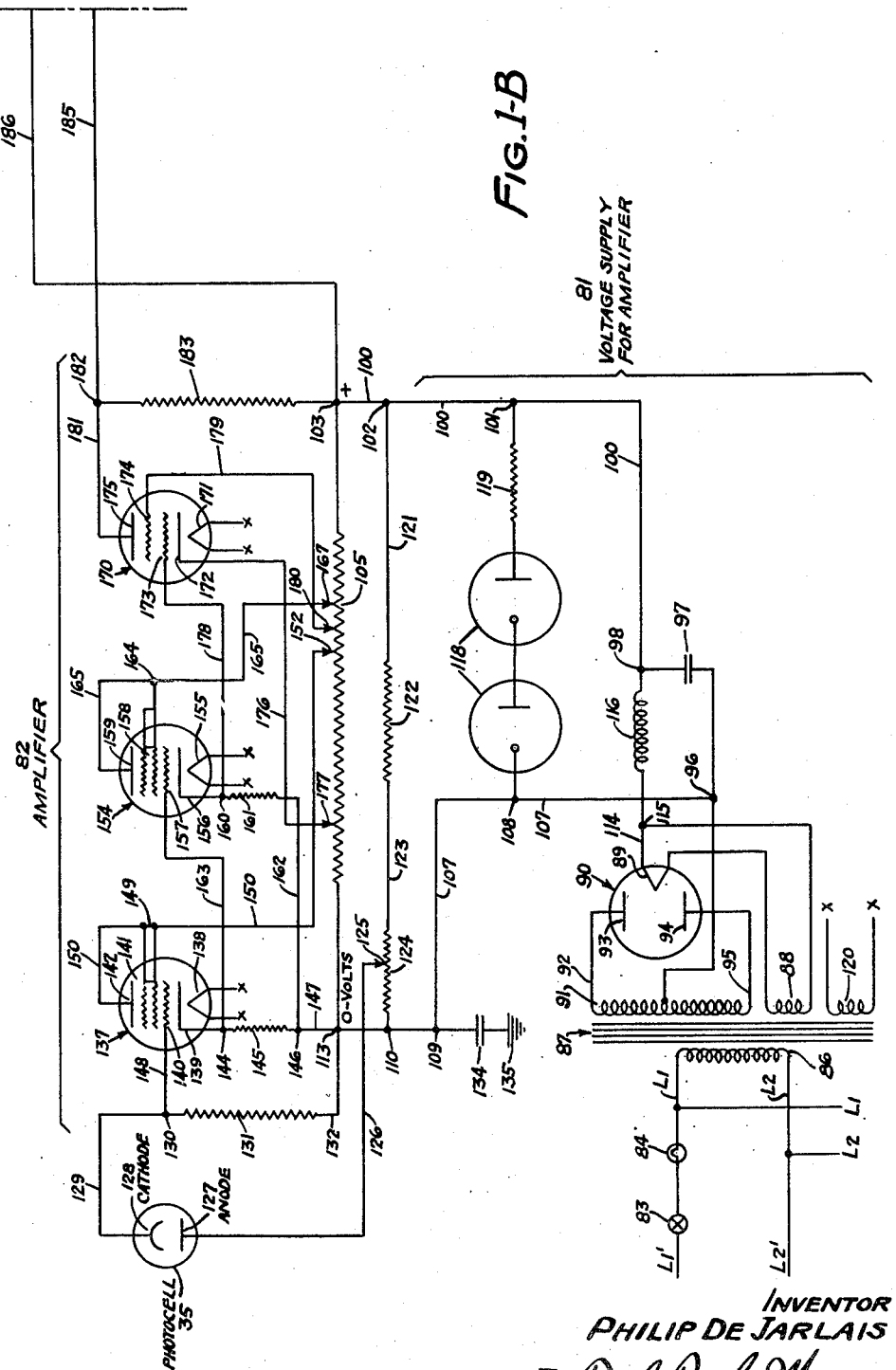

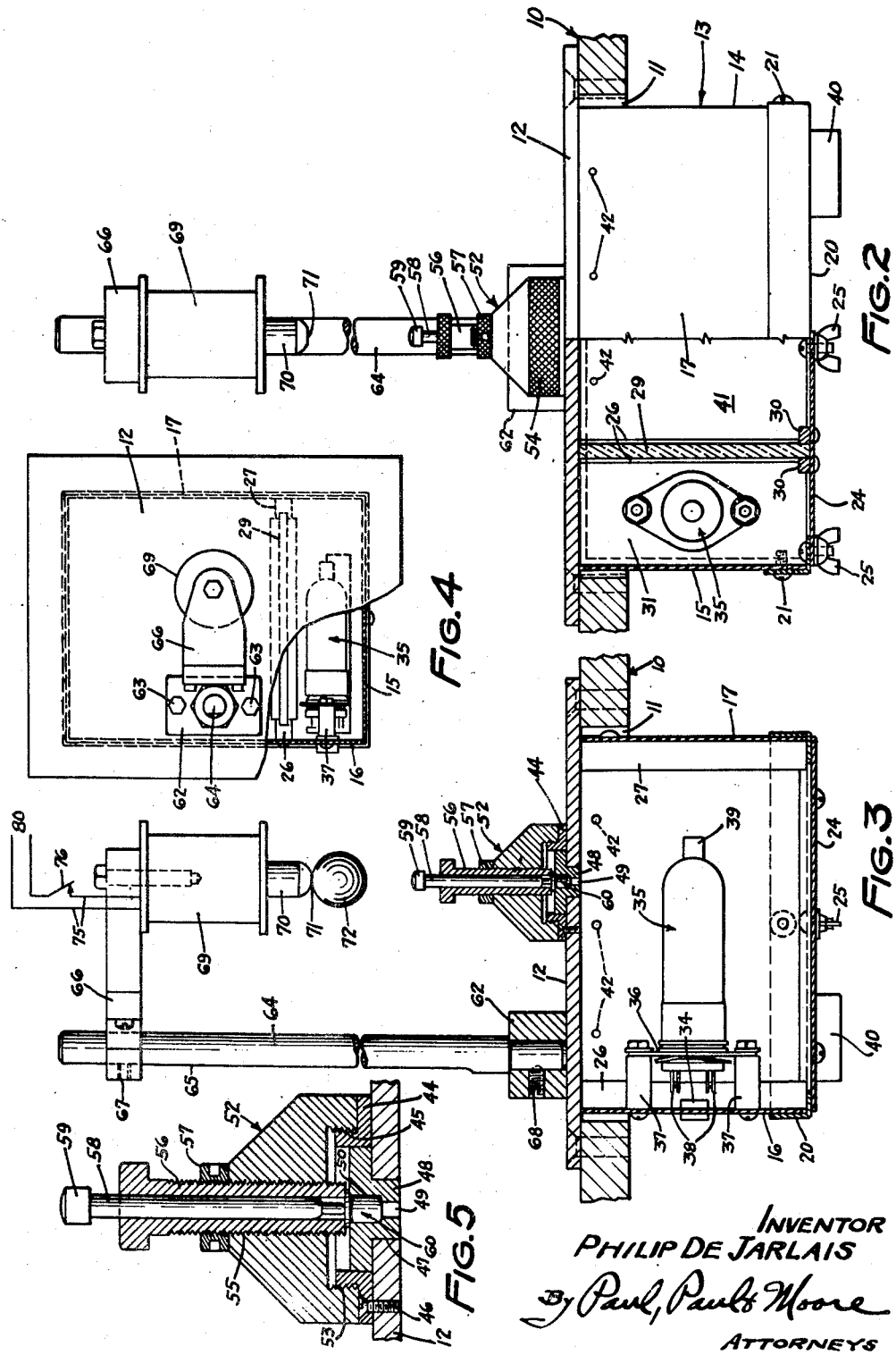

2,525,020

UNITED STATES PATENT OFFICE 2,525,020

EXPLOSIVE TESTING APPARATUS

Philip De Jarlais, Champlin, Minn., assignor to Federal Cartridge Corporation, Minneapolis, Minn., a corporation of Minnesota Application January 20, 1945, Serial No. 573,763

3 Claims. (Cl. 73—35)

1

This invention relates to apparatus for testing explosives for uniformity of explosive power, and particularly to the testing of primers or small arms ammunition. In testing primers for uniformity of performance, a selected number of samples are fired. Heretofore the only tests available have been whether or not the primer fired at all with a given hammer pressure on the firing pin. In accordance with the present invention there is provided a means for testing not only for the existence of the primer explosion but also the degree of primer explosion or "flash" that occurs.

It is an object of the present invention to provide means for testing explosives of the character described to determine the amount of explosive force as indicated by the "flash" of the explosion. It is a further object of the invention to provide an improved primer testing apparatus capable of visually indicating the amount of primer "flash." It is also an object of the invention to provide a photo-electric apparatus capable of indicating the primer "flash" and of providing a sustained indication by which the degree of explosion or "flash" is visually indicated and the indication sustained until manually reset. It is a further object of the invention to provide improved photo-electric amplifying and indicating apparatus of specific and general utility and to provide an improved explosive testing apparatus and adjuncts thereto.

The invention is illustrated with reference to the drawings in which

Figures 1A and 1B taken together are a wiring diagram of the electrical apparatus of the present invention;

Figure 2 is a front elevational view, partly in section, of the explosion testing apparatus and chamber;

Figure 3 is a side elevational view, partly in section, of the apparatus of Figure 2;

Figure 4 is a plan view, partly in section, of the apparatus of Figure 2; and

Figure 5 is an enlarged fragmentary sectional view of a portion of the firing pin mechanism used in the apparatus of Figure 2.

Throughout the drawings corresponding numerals denote identical parts.

While the invention is of general utility and may be utilized for the testing of ammunition of various sizes, the apparatus illustrated herein is constructed for the specific (yet illustrative) purpose of testing primer cups used in small arms ammunition such as shotgun shells, rifle bullets and the like.

2

Referring to Figures 2-5 there is illustrated a table or mounting board generally designated 10 which is provided with a cutout at 11 to receive the top plate 12 of a container generally designated 13 into which the primers are fired. The container is of rectangular configuration as herein illustrated, but may be of any suitable or convenient shape. It is provided with side walls 14 and 15, a back wall 16 and a front wall 17. A flanged bottom cover 20 is fastened to the side walls by means of screws 21 and is provided at its left end, as shown in Figure 2, with a bottom plate 24 that is held in place by means of wing nuts 25. On the front and back walls are provided channels 26 and 27 which serve to support a glass partition 29, the partition being likewise supported by ribs 30 on the bottom cover plate 24. In the space 31 between the side wall 15 and the glass partition 29 there is mounted a photocell generally designated 35 positioned in the socket 36, the latter being supported upon insulators 37. Suitable terminals 38 and 39 are provided for the photocell in a well known manner and the lead wires are taken out through grommet 34. At another portion of the bottom 20 there is provided a vent tube 40 that is connected to an exhaust blower so as to remove the smoke of the explosion from the space 41 between side wall 14 and the glass partition 29. The upper portions of the side and end walls are provided with venting apertures 42 so as to permit air to be drawn through the container to clear the smoke. It will be noted that the venting apertures are located well up on the side and end walls and are thus recessed into the space 11 in the table 10. Therefore no light can enter through these holes and accordingly the photocell is not disturbed in its operation. Any suitable light-shielded vents could be used.

Upon the upper part of the plate 12 there is fastened a flanged collar 44 having a female thread 45, the collar 44 being fastened to the plate 12 by a plurality of screws 46. The plate 12 is provided with a hole 47 and within the collar 44 there is positioned a removable flanged collar 48 that has a firing aperture 49 and has a recess 50 of appropriate size to receive the particular explosive element undergoing testing. The collar 48 may be removed and others inserted for receiving explosives of varying sizes undergoing testing. A conical cap generally designated 52 is threaded at 53 so as to be easily screwed onto the threads 45 of the flanged collars 44, the outer portion of the cap 52 being knurled at 54 as illustrated in Figure 2 so that it may be removed easily by the fingers of the operator. The cap 52 is internally threaded at 55 to receive the firing pin support 56 that is correspondingly threaded, the latter being held in vertical adjustment by the locking nut 57. It will be noted that the firing pin support 56 may thus be raised and lowered to any position desired so that its bottom will exert firm pressure on the margin of the explosive element 60 undergoing testing. In this instance the explosive is a primer cup used for shotgun shells, and it is held firmly in the recess 50 of the primer cup receiving collar 48. A firing pin is illustrated at 58 and is provided with a round upper surface 59, the pin 58 being fitted neatly so as to have a dry sliding fit in the firing pin support 56.

Upon the rear part of plate 12 there is provided a block 62 which is fastened in place by the cap screws 63. Block 62 serves as a support for the post 64 that has a flat 65 milled off at one place. A side arm 66 is mounted so as to slide up and down on the rod 64 and has a set screw 67 that abuts against the flat 65, thus accurately positioning the arm 66. The entire rod 64 is mounted for rotation and hence adjustment in the block 62 and is held by means of a set screw 68.

At the forward end of the arm 66 there is mounted an electromagnet 69 having a core 70 provided with a small flat area 71 at the bottom which serves centrally to locate the steel ball 72 which is suspended magnetically. Suitable wiring connections for the magnet 69 are provided by lines 75 which are connected through switch 76 to a source of direct current at 80. So long as switch 76 is closed magnet 69 is energized and serves to suspend the ball 72. The post 64 and side arm 66 are adjusted so that the ball is immediately above the firing pin 58, and the side arm 66 may be adjusted vertically so that the ball drops through a uniform vertical distance and thus applies a uniform striking pressure to the firing pin. When the switch 76 is opened the magnet 69 is de-energized, the ball 72 falls through a uniform distance striking the pin 58 and thus applies a uniform firing pressure to the primer or other explosive 60 undergoing testing.

The explosive therefore fires into the space 41 of the testing chamber 13 and the illumination or "flash" caused by the explosion passes through the glass partition 29 and falls upon the elements of the photocell. The degree of "flash" has been discovered to be indicative of the amount of explosion produced by the primer or other explosive, and the variation in electrical constants of the photocell thus serves as a signal impulse which through suitable amplification is then recorded or indicated as the performance characteristic of the explosive undergoing testing. Cover 24 may be removed and the glass partition 29 is wiped off from time to time so that no variable factor is introduced due to smoke-clouding of the glass. The interior of the casing 13 is painted a dull black and is likewise cleaned when occasion requires so that reflected light is likewise maintained at a minimum.

Referring to Figures 1A and 1B, by locating these drawings with Figure 1B at the left and Figure 1A at the right, there is provided a composite wiring diagram of the electrical apparatus of the invention.

In the lower part of diagram Figure 1B, opposite the bracket 81 is a power supply serving the amplifier illustrated under the bracket 82, the photocell which serves as the input of the amplifier being illustrated at 35. Power is supplied by alternating current lines $L_1'$ and $L_2'$ and is controlled by a suitable switch 83 and fuse 84 to feed lines $L_1$ and $L_2$ which then serve as supply bus bars to the entire apparatus. Lines $L_1$ and $L_2$ are connected to the primary 86 of a transformer generally designated 87, the transformer being provided with a low voltage secondary 88 that serves as the power supply for the filament 89 of a full-wave rectifier tube 90. The plate supply of rectifier tube 90 is provided by the high voltage secondary 91 of the transformer, terminal 92 thereof being connected to anode 93 and terminal 95 to anode 94. The mid-point of winding 91 is connected through junction 96 and line 107 to junction 108 and thence via line 107 to terminals 109 and 110 which are negative output. From filament 89 line 114 extends through junction 115 and inductance 116 to junction 98, thence through line 100, terminals 101 and 102 to terminal 103 which is positive output. The potentiometer resistor 105 is connected across terminals 113 and 103. A pair of voltage regulator tubes 118 are connected in series through resistor 119 from junction 108 on line 107 to junction 101 on line 100. The condenser 97, inductance 116 and voltage regulator tubes 118 serve to stabilize and remove substantially all ripple from the output of rectifier 90 in a well known manner. A third secondary 120 on transformer 87 supplies leads X—X which serve as filament supply to the filaments of the amplifier shown under the bracket 82 as hereinafter described.

Junction 102 on line 100 is connected through line 121, resistor 122, line 123 and resistor 124 to junction 110 and the latter is connected through condenser 134 to ground 135. Intermediate tap 125 of resistor 124 is of positive potential and is connected through line 126 to the anode 127 of the photocell 35, and from the cathode 128 of the photocell line 129 extends through junction 130 and resistor 131 to zero potential at terminal 113.

The first stage of amplification is a multiple grid, indirectly heated amplifier tube 137 having filament heater 138, cathode 139, a first grid 140, second and third grids 141 and an anode 142. The filament heater 138 is connected to power supply X—X as previously indicated and the cathode 139 is connected to junction 144 and thence through resistor 145, junction 146 and line 147 to zero potential terminal 113. Grid 140 is connected through line 148, to terminal 130 on the photocell cathode line 129 which thus forms the input. Grids 141 are connected together and are externally connected at 149 to the lead 150 extending from the anode 142 to a variable tap 152 on the potentiometer resistor 105.

The second stage of amplification is likewise a multiple grid, indirectly heated cathode tube generally designated 154 which may conveniently be of the same style as used in the first stage. The tube 154 is provided with a cathode heater 155, cathode 156, first grid 157, second and third grids 158 and anode 159. The cathode heater or filament is connected to terminals X—X of the transformer secondary 120, and cathode 156 is connected through junction 160, resistor 161, and line 162 to terminal 146. The first grid 157 of the second stage is connected through line 163 to terminal 144. The second and third grids 158 are connected together externally at 164 to the anode lead 165, the latter extending to the variable tap 167 on the potentiometer resistor 105.

The third stage of amplification is through an indirectly heated cathode, multiple grid thermionic tube generally designated 170 having cathode heater filament 171, a cathode 172, a first grid 173, a second grid 174 and an anode 175. The cathode heater filament 171 is connected to terminals of transformer secondary 120, the cathode 172 being connected through line 176 to variable tap 177 of the potentiometer resistor 105. The first grid 173 is connected through line 178 to terminal 160, the second grid 174 being connected through line 179 to the variable tap 180 of potentiometer resistor 105. The anode 175 is connected through line 181, through junction 182 to the output terminal 185. A resistor 183 is connected from junction 182 to positive supply 103, the latter serving as one terminal of the output, as exemplified by output line 186.

Referring to Figure 1A, in the lower part of the wiring diagram over the bracket 188 there is illustrated a bias voltage supply, while over the bracket 189 there is illustrated the indicator voltage supply. A time delay circuit for a purpose to be described is illustrated at the left of bracket 187. The indicator, which in this instance comprises a plurality of pilot lights each served by a grid controlled glow tube, is generally illustrated under the bracket 190. Input line 185 is connected to junction 191 and thence to junction 192 which is grounded as illustrated at 193. Input line 186 serves to supply a transient positive signal voltage. Its connection to the indicator apparatus will be described subsequently.

The bias voltage supply is provided by a transformer, rectifier, filter and voltage control system and includes supply lines $L_1$ and $L_2$ (from Figure 1B) that are connected to the primary 194 of the transformer generally designated 195. The low voltage secondary 196 is connected to the filament 197 of a full-wave rectifier tube 198. Transformer secondary 199 has one terminal connected through line 200 to one of the anodes 201 of the rectifier, the other terminal of the transformer being connected through line 202 to the other anode 203. The intermediate tap 208 of the winding 199 is connected through line 204 and serves as one of the output terminals of the rectifier, the opposite output being via line 205 from the rectifier cathode. A pair of condensers 206 and an inductance 207 serve to smooth out the direct current output of the rectifier and a voltage regulator tube 209 and variable voltage regulating resistor 210 are provided so that a uniform direct current voltage is supplied the terminals 211 and 212.

Referring now to the indicator voltage supply, alternating current is supplied to lines $L_1$ and $L_2$, the latter being grounded at 193 as shown. Line $L_1$ is connected through junction 213 to one terminal of the primary 214 of transformer 215, Line $L_2$ being connected through junction 216 and junction 217 to the opposite terminal of the primary 214. The secondary 218 of the transformer is connected to the filament 219 of a half-wave rectifier tube 220, the anode 221 of said tube being connected through line 222 and through relay contacts RL—1 to junction 213 on line $L_1$. From the mid-point 223 of the transformer secondary 218 output line 224 extends through junction 225 and inductance 226 to junction 227. The inductance 226 has a resistor 238 connected in parallel with it. From junction 227 line 228 extends through junctions 229 and 230, and thence through line 231, thence through the normally closed reset switch 234 and to line 235, the latter being connected in parallel through all of the signal lamps hereinafter described. From junction 217, line 218 extends through junctions 236, 237 and 238 to terminal 239 hereinafter referred to. Condensers 240 and 241, respectively, are connected between junctions 225—236 and 227—237 and they serve together with the inductance 226 and resistor 238 to smooth out the direct current output from rectifier tube 220. A resistor 242 is connected across junctions 230—238 and is provided with a variable tap 243 connected to junction 229 by which the value of this resistor may be varied. From junction 213 on supply line $L_1$ under transformer 215, line 245 extends to the cathode 247 of the thermionic tube 248. The tube 248 is provided with a filament heater 249 that is connected through supply lines Z—Z to the correspondingly numbered terminals Z—Z of the secondary 250 on transformer 195 of the bias voltage supply. The grid 251 of tube 248 and the anode 252 are connected together and are connected through line 253 and junction 254 to the winding of relay RL, the latter being bridged by a condenser 255 connected across its terminals 254 and 239.

Lines $L_1$ and $L_2$ are connected to the primary 256 of a transformer 258, secondary 259 of which serves to supply power to terminals Y—Y, one terminal being grounded through line 256 that is connected to line $L_2$ as indicated. The terminals Y—Y serve to supply power to the filaments of the indicator tubes hereinafter referred to.

From the bias voltage positive terminal 211, previously referred to, there extends line 260 that is connected through junction 261 to junction 191 on the input line 185. From junction 261 there is a connection through resistor 262 to junction 263. Resistor 262 is shorted by a line from junction 263 to variable tap 264 so that a portion of the resistor may be bridged out, thereby varying its circuit value.

From junction 263 there extends a circuit through a plurality of resistors 265—273 connected in series and terminating at junction 273' which is connected through line 275 to the bias voltage negative terminal 212, previously referred to. The resistors 262 and 265—273 form a potentiometer which is supplied with a direct current voltage by the bias voltage supply circuit (terminals 211—212). The values of resistors 262 and 265—273 determine the voltages applied at junction 63 and junctions 265'—273'. The resistor 262 and resistors 265—273 may be of uniform value or may be of any desired value so as to establish selected potentials at the various junctions. In an exemplary installation resistor 262 is of 5000 ohms value with a tap at 2250 ohms while resistors 265—273 are of 500 ohms each. The resistors 262 and 265—273 thus establish a definite potential at junctions 263 and 265'—273', grading from a slight negative value at junction 263 to more negative values for each successive junction 265' through 273'. These junctions thus establish the normally negative potentials of the grids of tubes 291—300 (Thyratrons) as hereinafter described. In some instances it is desirable to have unevenly graded potentials at junctions 263 and 265'—273' so as to provide a very "fine" calibration at certain portions of the voltage scale while allowing a "coarse" calibration at other portions of the scale.

The indicators (tubes 291—300 and their associated pilot lamps) are all connected in parallel and are identical. Thus, from terminal 263 a circuit extends through resistor 276 to junction 277, and thence through a condenser 278 to terminal 279 on the input line 186, junction 277 being connected to the grid 280. Tube 291 has a filament 282 that is supplied with power from transformer secondary terminals Y—Y of transformer 258. The anode 284 of the grid controlled glow tube is connected through a pilot lamp 285 to the line 235 which extends back through the normally closed reset switch 234 to the indicator voltage supply as previously described.

The transient signal voltage incoming on line 186 is positive in value and is impressed through condenser 278 upon junction 277 and hence upon grid 280. The potential of grid 280 is thus caused to shift in the positive direction and depending upon the magnitude of the transient positive voltage incoming signal. Where this positive signal is of sufficient magnitude it causes a discharge to take place between the cathode 282 to anode 284 and a circuit is thus established to signal lamp 285. Once started, tube 291 continues to conduct until its cathode-anode circuit is interrupted.

The remaining grid controlled glow discharge tubes 292—300 (or more if they are employed), are connected similarly, except that the grid potential normally applied on each successive tube is higher than the grid potential applied on its lower numbered neighbor and therefore an incoming signal must have a greater positive value to initiate discharge in tube 292 than is required to initiate discharge in 291. Similarly, an incoming signal must have a greater value to discharge tube 293 than is required to discharge tube 291 and tube 292.

Assuming that the incoming signal wave is of sufficient positive value, the potential applied to all of the grids may be sufficient to initiate current flow through any given sequence of tubes beginning at tube 291 and continuing through successive tubes to any stopping point up to the last tube 300. The tubes thus rendered conductive begin to discharge and their corresponding signal lamps are energized. Thus, the number of tubes that discharge indicates the magnitude of the incoming signal wave.

*Operation*

In order to initiate operation the switch 83 is closed thus establishing a circuit from line L₁' to Line L₁. Lines L₁ and L₂ thus being energized excite transformers 87, 195, 215 and 258. When transformer 87 is energized it causes the operation of the rectifier circuit, thus establishing a potential across the potentiometer resistor 105, and the amplifier under the bracket 82 is energized. A potential gradient is likewise established across resistor 124, and since the anode of the photocell is connected to tap 125, a positive voltage is impressed across the cell and through resistor 131 to terminal 113. When the explosive cartridge 60 undergoing testing is fired a "flash" occurs in the container 13 and light thus falls upon the photocell 35 causing a discharge to take place from the cathode to the anode. This input signal is impressed upon grid 140 of the first stage amplifier tube 137 and the signal is amplified through tubes 154 and 170 in a well known manner and is impressed across resistor 183 at terminals 182 and 103, the signal being communicated through lines 185 and 186 to the indicator apparatus shown in Figure 1A. The signal voltage on line 186, however, will not be effective to operate the indicator until a predetermined time has initially elapsed after the switch 83 has been closed to energize the system. This time delay is provided so as to prevent the indicator grid controlled glow discharge tubes 291-300 from being caused to discharge before the filaments of these tubes have heated to an operating temperature. The time delay is provided as follows:

When switch 83 is closed and lines L₁ and L₂ are thus energized, this energizes the primary 194 of transformer 195 and secondary 250 which accordingly causes the filament of the time delay tube 248 to be energized. After a predetermined interval this tube becomes conductive and a circuit is established from line L₁ (at the indicator voltage supply 189) to junction 213 and thence through line 245, tube 248 which is then conductive, line 253, the coil RL of the time delay relay to line 218, to junction 217 on line L₂. Relay RL is thus energized and closes its contacts RL—1 in the plate circuit of the indicator voltage supply tube 220. Until this has occurred the indicator tubes 291—300 cannot discharge regardless of the signal impressed upon its grids. Assuming then that the input signal voltage on line 186 occurs after relay RL has actuated this positive signal voltage is impressed upon condenser 278 of tube 291 of the indicator apparatus and through each of the parallel condensers to the grids of the tubes 292—300. The signal voltage is thus applied to the grids of all of the tubes, and depending upon the magnitude of the positive signal voltage will cause one or more successive tubes (beginning at tube 291 and reading to the right) to become conductive. When this occurs a circuit is established from the cathode 282 to the anode 284 of tube 291 and from the cathode to the anode of each of the tubes as has been energized by the positive signal impressed upon it. Assuming, for example, that tubes 291—293 thus are energized a circuit is established from line L₁ at the indicator voltage supply through the then closed contacts RL—1 of the time delay relay through line 222 to the anode 221 of tube 220, and thence to the cathode 219 from which a circuit continues to the center point of transformer winding 213 and thence over line 224, inductance 226, line 228, through the normally closed reset switch 234 and line 235 to the signal lamps corresponding to the glow discharge tubes 291—293, thence in parallel through these signal lamps and through the glow discharge tubes which are then conductive and through the filament circuit Y—Y of the filament transformer ground connection 256 to junction 216 on line L₂. The signal lamps are therefore energized and remain energized until the reset switch 234 is pushed so as to open this circuit and re-establish non-conductive conditions in the grid controlled thermionic tubes 291—293.

In the event a smaller or larger positive voltage is received on line 186 a lesser or greater number of tubes 291—300 are operated along the signal lamps corresponding to them. In this manner the degree of "flash" produced by the explosive undergoing testing is readily indicated and the indication is maintained for a period of time sufficient to make any desired recorded notation of the result.

Many variations may be made in the apparatus without departing from the spirit of the invention. Thus, the container 13 and apparatus mounted on it may be enlarged sufficiently to take full size explosives such as shotgun shell cartridges, 22 caliber cartridges or rifle cartridges of larger caliber and the "flash" of the explosive produced thereby readily measured in the apparatus. Any suitable triggering apparatus may be substituted for the magnet 69 and ball 72 as illustrated. The ball and magnet arrangement provides an exceptionally uniform method of applying firing pin pressure and is especially useful for the testing of percussion caps of all sorts.

For the indicating instrument there may likewise be substituted any desired maximum-reading indicator capable of maintaining indication corresponding to the signal voltage. In some instances it is feasible to eliminate the pilot lamps 285, etc. since the glow discharge tubes may readily be mounted in a convenient position such that the light therefrom is visible to the operator. These and other variations will be apparent to those skilled in the art and are within the purview of the invention herein illustrated, described and claimed.

What I claim is:

1. An apparatus for testing explosive charges comprising a container, a photocell mounted in the container so as to be normally dark, means for exploding the charge into the container in a direction so that the light flash therefrom illuminates the photocell, amplifier means connected to the cell for providing a positive signal voltage which is a function of the light falling upon the cell, a plurality of grid controlled glow tubes each having an input circuit and a cathode and anode therein and having their grids normally biased negatively in progressively greater amounts from tube to tube, and means for applying the amplifier positive signal voltage upon the grids of said tubes to operate one or more of them depending upon the amount of said positive signal voltage.

2. The apparatus of claim 1 further characterized in that the output of each of said grid controlled glow tubes is connected to a signal which is operated when the tube is conductive, and means for de-energizing all of said tubes.

3. A photoelectric apparatus comprising a housing, a photocell mounted in the housing so as to be normally dark, said housing being provided with means to hold an explosive charge which may be exploded therein, the photocell being positioned within the housing so that the light flash from said explosion falls upon the photocell, amplifier means connected to the photocell for providing a positive signal voltage which is a function of the light flash from said explosion falling upon the photocell, a plurality of grid controlled glow tubes each having an output circuit and a cathode and anode therein and having their grids normally biased negatively in progressively greater amounts from tube to tube, means for applying the amplifier positive signal voltage upon the grids of said tubes to operate one or more of them depending upon the amount of said positive signal voltage, and circuit interrupting means in the output circuits of said tubes for maintaining said output circuit initially open for a period sufficient to allow the cathodes thereof to heat to operating temperature.

PHILIP DE JARLAIS.

REFERENCES CITED

The following references are of record in the file of this patent:

UNITED STATES PATENTS

| Number | Name | Date |
|---|---|---|
| 1,716,775 | Hayes | June 11, 1929 |
| 2,087,598 | Hebler | July 20, 1937 |
| 2,095,124 | Cockrell | Oct. 5, 1937 |
| 2,171,861 | McCabe | Sept. 5, 1939 |
| 2,199,394 | Dewan | May 7, 1940 |
| 2,300,361 | Reynolds | Oct. 27, 1942 |
| 2,323,301 | Anderson | July 6, 1943 |
| 2,402,580 | Roters | June 25, 1946 |

FOREIGN PATENTS

| Number | Country | Date |
|---|---|---|
| 12,546 | Great Britain | 1892 |

OTHER REFERENCES

Book—Marshall's "Explosives." Publisher J. & A. Churchill, London, 1915, pg. 428.